United States Patent
Conrad et al.

(10) Patent No.: US 12,447,897 B2
(45) Date of Patent: Oct. 21, 2025

(54) MOTOR VEHICLE COMPRISING A PLURALITY OF INTERIOR LIGHT MODULES

(71) Applicant: Bayerische Motoren Werke Aktiengesellschaft, Munich (DE)

(72) Inventors: Felix Conrad, Ebenhausen-Schaeftlarn (DE); Michael Mueller, Munich (DE); Sebastian Mueller, Oberhaching Deisenhofen (DE); Jens Veddeler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 104 days.

(21) Appl. No.: 18/278,030

(22) PCT Filed: Apr. 7, 2022

(86) PCT No.: PCT/EP2022/059263
§ 371 (c)(1),
(2) Date: Aug. 21, 2023

(87) PCT Pub. No.: WO2022/223309
PCT Pub. Date: Oct. 27, 2022

(65) Prior Publication Data
US 2024/0131985 A1    Apr. 25, 2024
US 2024/0227668 A9    Jul. 11, 2024

(30) Foreign Application Priority Data
Apr. 20, 2021    (DE) .................... 10 2021 109 954.4

(51) Int. Cl.
*B60Q 3/80*    (2017.01)
(52) U.S. Cl.
CPC .................... *B60Q 3/80* (2017.02)

(58) Field of Classification Search
CPC ........................................................ B60Q 3/80
See application file for complete search history.

(56) References Cited

U.S. PATENT DOCUMENTS 10,194,505 B1 * 1/2019 Perera ................. H05B 45/20
2015/0321603 A1 * 11/2015 Borgholthaus ........... B60Q 3/80
                                                              315/77

(Continued)

FOREIGN PATENT DOCUMENTS

DE    10 2016 000 545 A1    1/2017
DE    10 2016 007 477 A1    2/2017

(Continued)

OTHER PUBLICATIONS

International Search Report (PCT/ISA/210) issued in PCT Application No. PCT/EP2022/059263 dated Aug. 1, 2022 with English translation (5 pages).

(Continued)

*Primary Examiner* — Alexander H Taningco
*Assistant Examiner* — Pedro C Fernandez
(74) *Attorney, Agent, or Firm* — Crowell & Moring LLP (57) ABSTRACT

A motor vehicle includes a central light control unit and a plurality of interior light modules, each of which includes a single light source or a plurality of light sources. The motor vehicle also includes a data bus via which the central light control unit and the interior light modules are coupled to one another. The central light control unit is configured to transmit control commands to the interior light modules in order to trigger motor vehicle interior lighting effects, wherein control information, which is included in the control commands and includes at least one color value and one brightness value for the interior light modules, is created based on runtime-variable input data. The runtime-variable input data is based on current ambient conditions of the (Continued)

motor vehicle and/or variable data sources of the motor vehicle.

17 Claims, 5 Drawing Sheets

(56) References Cited

U.S. PATENT DOCUMENTS

2019/0135173 A1      5/2019   Bauer et al.
2021/0070173 A1*   3/2021   Rogge .................... B60K 35/21

FOREIGN PATENT DOCUMENTS

| DE | 10 2015 118 497 A1 | 5/2017 |
| DE | 10 2016 211 737 A1 | 1/2018 |
| DE | 10 2017 011 499 A1 | 6/2019 |
| DE | 10 2019 120 602 A1 | 2/2021 |
| WO | WO-2020125943 A1 * | 6/2020 |

OTHER PUBLICATIONS

German-language Written Opinion (PCT/ISA/237) issued in PCT Application No. PCT/EP2022/059263 dated Aug. 1, 2022 with English translation (10 pages).
German-language Search Report issued in German Application No. 10 2021 109 954.4 dated Aug. 20, 2021 with partial English translation (13 pages).

* cited by examiner

MOTOR VEHICLE COMPRISING A PLURALITY OF INTERIOR LIGHT MODULES

BACKGROUND AND SUMMARY OF THE INVENTION

The invention relates to a motor vehicle comprising a plurality of interior light modules, which each comprise a single or a plurality of light sources and can be activated by a central light control unit.

More recent motor vehicles have so-called ambient light functions in the interior, which ensure decentralized or noticeable illumination of the interior depending on the vehicle type or target group. The use of this type of lighting facilitates the orientation for the passengers in the vehicle and creates an individual and pleasant atmosphere. The control and definition of the light functions is implemented here by a central control unit or in conjunction with peripheral control units assigned to the interior light modules.

The displayed light colors and brightnesses are generally constant light scenes settable by the customer, in which all interior light modules light up in the same color or display predefined light effects that always change in the same manner.

Light effects are known from entertainment electronics, in which RGB light sources incorporated in TV display screens are synchronized in color with the display of the TV image. For this purpose, the colors of the TV image displayed at the edge of the TV display screen are evaluated and these colors are emitted by way of the RGB light sources for ambient lighting.

The invention is based on the object of providing a motor vehicle having a structurally and/or functionally improved interior lighting.

This object is achieved by the features of the claimed invention.

A motor vehicle according to embodiments of the invention comprises a central light control unit and a plurality of interior light modules, which each comprise a single or a plurality of light sources. The interior light modules are distributed in the motor vehicle and can be arranged, for example, on the door insides, on the motor vehicle roof lining, on the motor vehicle A-pillar, on the motor vehicle B-pillar, on the instrument panel, on the dashboard, on the glove compartment, around operating elements, around a display, and/or on an instrument panel. The interior light modules can also be part of these components. The interior light modules can be distributed in the motor vehicle in such a way that they are arranged at the same height or at multiple different heights.

A respective interior light module comprises a single or a plurality of light sources. The light sources are in particular different-colored LEDs and/or RGB-LEDs. An interior light module can comprise a plurality of light sources or light source groups arranged adjacent to one another, which can be switched on or activated at the same time or at different times from one another and can preferably be switched off or deactivated at the same time or at different times from one another. An activation or deactivation at different times gives the impression of a moving light to an observer, for example a chaser light. For this purpose, the light sources of a respective interior light module can be activated and/or deactivated sequentially and cyclically.

The motor vehicle furthermore comprises a data bus, wherein each of the interior light modules is coupled via the data bus to the central light control unit.

The central light control unit is configured to transmit respective control commands to the interior light modules to trigger motor vehicle interior light effects. An item of control information contained in the control commands, which comprises at least one color value and one brightness value for the interior light modules, is generated from runtime-variable input data. The runtime-variable input data are based on current ambient conditions of the motor vehicle and/or variable data sources of the motor vehicle.

Because the control information contained in the control commands is generated from runtime-variable input data, it is possible to vary a light scene in the motor vehicle from the user perception in real time and interactively. The consideration of ambient conditions and/or variable data sources of the motor vehicle not only enables visually appealing light scenes or light effects, but also the generation of situationally matched warning signals, which can be intuitively perceived by an occupant of the motor vehicle.

In one expedient embodiment, it is provided that the central light control unit is configured to determine an assignment rule from the runtime-variable input data, from which the assigned control information, which comprises at least the color value and the brightness value for a respective interior light module or its light source or plurality of light sources, originates for a respective interior light module. The assignment rule represents an aid to be able to determine the control information for a respective interior light module from the runtime-variable input data. With the aid of the assignment rule, in particular the amount of data from current ambient conditions and/or variable data sources is simplified and/or reduced so strongly that it is possible to determine the control information, which comprises at least the color value and the brightness value for a respective interior light module.

The assignment rule expediently comprises an information matrix having a number of pixels, wherein the number of pixels corresponds to the plurality of interior light modules or groups of interior light modules and wherein each of the pixels comprises at least the color value and the brightness value for the assigned interior light module or the assigned group of interior light modules. The number of pixels is thus at least 1 and corresponds at most to the plurality of interior light modules. All light modules can be combined into only one group, for example, so that the information matrix comprises one pixel. The assignment rule therefore determines a single color and brightness from the input data, which are then each displayed at a point in time in all light modules. The information matrix can be constructed in such a way that it takes into consideration the arrangement of the plurality of interior light modules in the motor vehicle. For example, the number of the lines of the information matrix can correspond to the number of heights or levels at which interior light modules are arranged, e.g., top, middle, and bottom. The number of the columns of the information matrix can correspond, for example, to the number of interior light modules arranged distributed in a plane. In the simplest case, the information matrix can correspond to a single line and a number of columns (entries), wherein the number of columns (entries) corresponds to the plurality of interior light modules. Each of the pixels then corresponds to a specific interior light module in the motor vehicle or assigned groups of interior light modules.

A further expedient embodiment provides that the assignment rule is generated from an image, i.e., is applied originating from an image. The image can, according to a first variant, be a light scene outside the motor vehicle recorded by a camera of the motor vehicle at the runtime. In a second, alternative variant, the image can be an image of a display screen of the vehicle captured at the runtime.

In the first variant, the ambient condition is defined by the light scene outside the vehicle, which is recorded by the camera of the motor vehicle. In the second variant, for example, the images displayed on a display screen of the motor vehicle, for example the central control display, are evaluated. These can be, for example, entertainment videos or a still image generated or provided by an entertainment source, such as cover art of a song played via the radio or other sound source. The image which is displayed on a display screen of the vehicle can also be an image provided by the customer, for example a background image.

To generate the information matrix, a low-resolution intermediate image, which consists of a number of areas corresponding to the number of pixels of the information matrix, is generated from the image captured by the camera or displayed on the display screen of the motor vehicle. One of the pixels is assigned to each of the areas. For example, the dominant items of color and brightness information of the evaluated image are accepted in the areas. In one variant, for example, colors at the edge of the image can be accepted. In another variant, the image can be divided into the areas. For each area, the pixels of all color values can be ascertained and statistically evaluated. The dominant color, for example a mean value in a specified color scheme, can then be used as the control information for a respective area.

A further expedient embodiment provides that the assignment rule is generated from sensor data of the motor vehicle. The processing of sensor data can take place alternatively or additionally to the image which at the runtime is recorded by a camera or is captured from a display screen of the motor vehicle.

A further expedient embodiment provides that the assignment rule is generated from ambient data, wherein a traffic situation and/or an ambient brightness are processed as the ambient data. The processing of ambient data can take place alternatively or additionally to the image which at the runtime is recorded by a camera or captured from a display screen of the motor vehicle. The processing of ambient data can take place alternatively or additionally to the sensor data of the motor vehicle.

A further embodiment provides that a movement effect for the light sources of the respective plurality of interior light modules is ascertained from the sensor data, in particular a current vehicle velocity, and/or the ambient data.

For example, a brightness in the surroundings and/or in the interior of the motor vehicle can be determined from sensor data of a light sensor. If a current travel velocity of the motor vehicle is additionally or alternatively processed by a velocity or GPS sensor—even without the presence of camera-based information—a movement effect can thus be ascertained for the interior light modules, based on the movement of the motor vehicle and/or the current brightness of the surroundings of the motor vehicle. A movement of light effects, for example linearly in relation to the travel velocity and/or depending on the ambient brightness, can then be ascertained from the sensor data and output by the interior light modules as the vehicle interior light effect.

In particular, one or more brightness values and/or color values, each for the plurality of interior light modules and their light source or plurality of light sources, are ascertained from the sensor data and/or the ambient data.

A further expedient embodiment provides that the sensor data comprise items of geoinformation of the motor vehicle, in dependence on the value of which the brightness value(s) and/or the color value(s) and/or the movement effect is determined or corrected, wherein one or more of the following parameters is processed as geoinformation: a motor vehicle position, a travel direction, a local time zone, an item of weather information, an item of map information, a time of day. The list is not exhaustive and can be supplemented with further suitable parameters which can be used to determine a motor vehicle interior light effect.

The surroundings of the motor vehicle, in which it presently moves, can be ascertained in a model-based manner from the geodata, for example. In particular, the determination of one of multiple predefined categories, to which one or more predefined motor vehicle interior light effects can be assigned, is possible. The following can be provided as predefined categories, for example: "city at night with display windows" with colorfully lit surroundings, "forest in the daytime" as a variable green tone, "country road at twilight" depending on the direction of a sunset, etc. This list is not exhaustive and can be supplemented with further suitable parameters.

According to a further expedient embodiment, the assignment rule is generated from an item of audio information of the motor vehicle and/or a user terminal and/or the voice of a user of the motor vehicle. For example, music from entertainment sources of the motor vehicle or a user terminal, such as a smart phone, a portable music player, and the like, can be used to generate the control information for the plurality of interior light modules. The processing can take place, for example, depending on a genre definition, such as music or speech. Preprocessing in terms of a filtering can be performed in which it is defined depending on the sound source, such as an entertainment source (radio, telephone, music player, etc.) or a warning tone whether the audio information is selected for a light production or not.

The processing of the audio information can take place, for example, in such a way that the sound signal is scanned for periodic properties. The known Fourier transform can be applied for this purpose, for example. After the scanning, evaluable periodic levels for specific frequency bands are provided. These can be used to change individual light sources or groups of light sources in the corresponding level in color and/or brightness. It can therefore be provided that the frequency and/or the volume and/or the rhythm of the audio signal which is output by the motor vehicle and/or is captured by a microphone of the motor vehicle is evaluated as audio information.

According to a further expedient embodiment, it can be provided that the control information contained in the control commands is overlaid with further items of control information from the runtime-variable input data, which cause predefined, in particular static, light effects. Predefined light effects is understood here as the output of light scenes or light effects as explained at the outset, namely, for example, having uniform brightness and uniform color in accordance with a preselection of the user of the motor vehicle.

A further expedient embodiment provides that the motor vehicle comprises a plurality of peripheral light control units distributed in the motor vehicle, wherein the plurality of interior light modules is each assigned one peripheral light control unit, and wherein the central light control unit and the peripheral light control units are coupled to one another via the data bus. Due to the allocation of the control function onto the central light control unit and the plurality of peripheral light control units, complex motor vehicle interior light effects are enabled without overloading or without excessively loading the data bus technologies typically used in motor vehicles, and without dispensing with the central controller. For this purpose, for example, predefined light effect parameter sets can be stored in the peripheral light control units, so that it is only necessary to transmit light effect parameter sets to the peripheral light control units to activate the interior light modules. The allocation of the control functions between the central light control unit and the peripheral light control units can also take place in another manner, however.

The invention will be explained in more detail hereinafter on the basis of examples with reference to the figures.

DETAILED DESCRIPTION OF THE DRAWINGS

Figure 1:
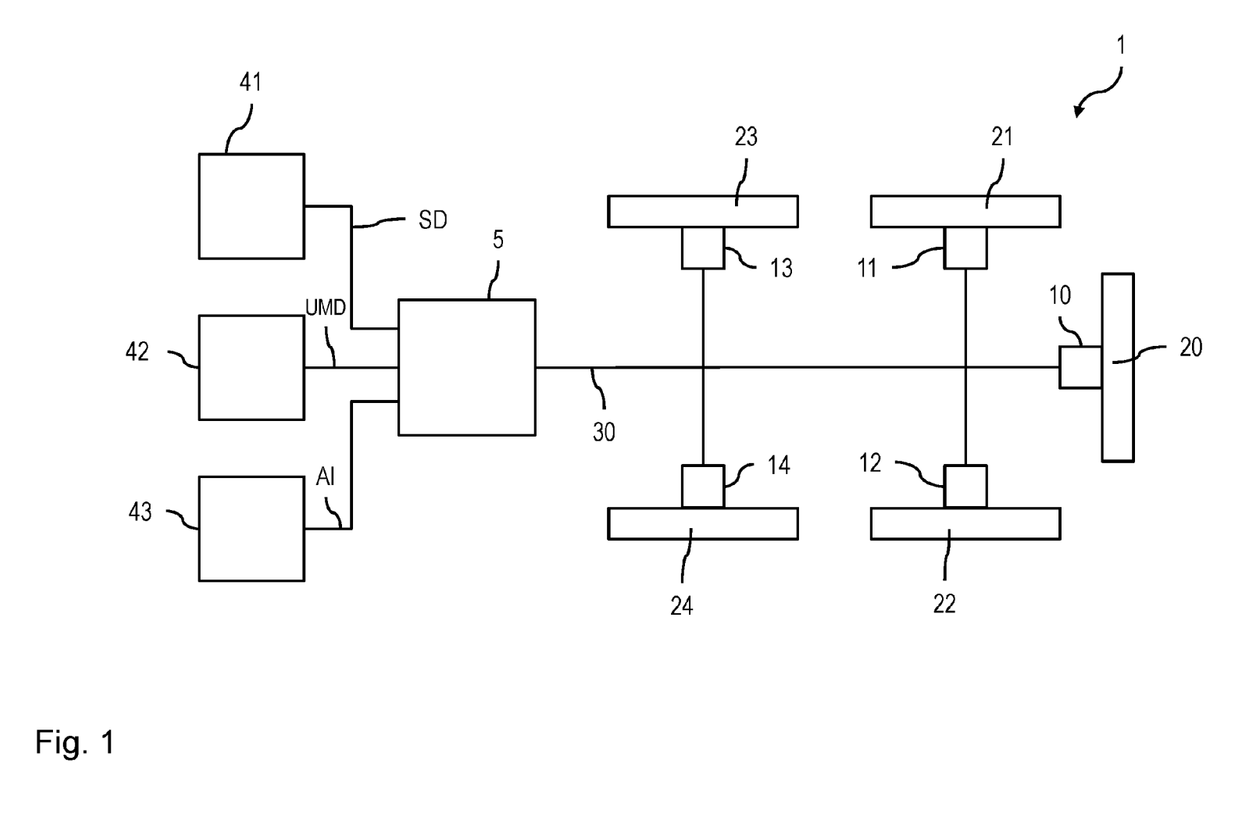
FIG. 1 shows a simplified schematic outline of an interior lighting system of a motor vehicle and the sensors used for its activation.

FIG. 1 shows a schematic illustration of a motor vehicle 1 having an interior lighting system formed therein. The interior lighting system comprises, for example, five interior light modules 20-24, which each comprise a plurality (not shown in greater detail) of LED-based light sources. The LED-based light sources can comprise a plurality of individual different-colored LEDs and/or a plurality of RGB-LEDs.

The light of the light sources of the interior light modules 20-24 can be coupled into a light guide (not shown), guided through the light guide, and decoupled again at desired areas. Alternatively, the light of the light sources shines through a diffuser plate or a component similar to a diffuser plate.

The interior light modules 20-24 can optionally each be assigned to a peripheral light control unit 10-14 and can be coupled thereto to transmit data. The activation of the interior light modules 20-24 takes place by way of a central light control unit 5 known per se, which is connected via a data bus 30, for example a LIN bus, to transmit data directly to the interior light modules 20-24 or to the peripheral light control units 10-14.

The interior light modules 20-24 and their optionally assigned peripheral light control units 10-14 are incorporated, for example, at equal height in a dashboard (not shown) and an interior trim (also not shown) of the left or right driver door. For example, the interior light module 20 and the optionally provided peripheral light control unit 10 can be installed in the dashboard. The interior light modules 21, 23 and their optionally assigned peripheral light control units 11, 13 can be incorporated, for example, in the interior trim of the left front and rear doors and the interior light modules 22, 24 and the optionally provided assigned peripheral light control units 12, 14 can be incorporated in the interior trim of the right front and rear doors.

The number of the interior light modules and their arrangement in the motor vehicle is solely by way of example and can be implemented differently in practice. In particular, the number of the interior light modules can be much higher, so that, for example, the interior light modules are arranged distributed at different height levels of the motor vehicle.

The activation of the interior light modules 20-24 or their light sources plays a subordinate role for embodiments of the present invention and can therefore take place in any desired manner. For example, if provided, the peripheral light control units 10-14 can each comprise a data memory, in which light effect parameter sets are stored, to each of which a light effect identifier is assigned. Alternatively, respective control commands to the interior light modules can be generated by the peripheral light control units at the runtime, wherein the central light control unit assumes a superior control. In a further alternative embodiment, control commands to the interior light modules 20-24 can also be generated directly by the central light control unit and transmitted to the interior light modules 20-24.

The central light control unit 5 is configured to transmit respective control commands to the interior light modules 20-24 and/or the peripheral light control units 10-14 in order to trigger motor vehicle interior light effects. An item of control information contained in the control commands is generated from runtime-variable input data SD, UMD, AI. The runtime-variable input data SD, UMD, AI are based on current ambient conditions of the motor vehicle 1 and/or variable data sources of the motor vehicle 1.

For this purpose, the central light control unit 5 is connected (directly or indirectly) to sensors 41, 42 for providing sensor data SD of the motor vehicle and for providing ambient data UMD as input data. Furthermore, the central light control unit 5 is connected to an audio source 43 for providing audio information AI as further input data.

The audio source 43 can be an audio source of the motor vehicle or a user-related audio source, which is connected, for example, via a suitable interface (wireless or wired) in the motor vehicle. A user-related audio source can be, for example, a user terminal, such as a smart phone, a tablet, or a music player.

The term "runtime-variable input data" is to be understood to mean data received in real time by the central light control unit 5 as the input data SD, UMD, AI, which can have a different value and/or different parameters depending on the point in time of their reception. The processing of the corresponding input data SD, UMD, AI therefore results, depending on their contents, in different items of control information in each case, which are contained in the control commands for the interior light modules 20-24. A respective item of control information in a control command generally comprises at least one color value and one brightness value for the respective interior light modules 20-24 or their light sources.

The central light control unit 5 is generally configured to determine an assignment rule from the runtime-variable input data SD, UMD, AI, from which the assigned control information for a respective interior light module 20-24 can be inferred. The assignment rule expediently includes an information matrix having a number of pixels. The information matrix can comprise the number of pixels in an arbitrary allocation onto columns and lines. The number of pixels of the information matrix corresponds in principle to the plurality of interior light modules 20-24, wherein each of the pixels comprises at least the color value and the brightness value for the assigned interior light module 20-24 as the control information. In the exemplary embodiment shown in FIG. 1, such an information matrix then includes a number of five pixels.

The structure of the information matrix can follow, for example, the arrangement of the interior light modules in the motor vehicle. In particular, the structure of the information matrix can take into consideration the number of the height levels in which interior light modules are arranged. In the exemplary embodiment described in FIG. 1, the interior lighting system includes interior light modules in only one plane. It is expedient here if the information matrix is provided, for example, as a 1×5 matrix (1 line×5 columns). In contrast, if the interior lighting system includes interior light modules in multiple planes (e.g., in the area of the roof, the inner doors, and the footwell, thus three), the assignment matrix could thus consist of three lines, for example, wherein each line is assigned one height level of interior light modules. The top elements of the information matrix could thus be assigned to interior light modules located higher, while lower elements of the information matrix are assigned to interior light modules arranged at the bottom in the motor vehicle. The number of the columns then results from the number of the interior light modules of the height level, in which the most interior light modules are arranged.

The calculation of the information matrix as the assignment rule takes place progressively and can be recalculated, for example, upon each change of the input data. A cyclic redetermination of the information matrix as an assignment rule is also conceivable. The repetition frequency is dependent on which input data are processed. If images output on a display screen of the motor vehicle are processed as the image information, for example, such as a cover art of a song or a background image of a user of the motor vehicle, a recalculation of the information matrix as the assignment rule can thus be generated with each change of the content. Cyclic scanning is then not necessary.

In contrast, if images generated by a camera, which captures the surroundings of the motor vehicle, are processed, cyclic scanning can be expedient. This can also be provided if items of audio information are primarily reacted to.

In each of FIGS. 2 to 5 described hereinafter, schematic illustrations of the generation of runtime-variable light scenes are described, wherein steps S1-S3 shown in FIGS. 2 to 5 are carried out by the central light control unit 5. In step S4, the output of the light scene generated by the central light control unit 5 by way of the interior light modules 20-24 is symbolized in each case by the star.

In each of FIGS. 2 to 5, step S1 shows the raw data considered by the central light control unit 5 as input data. Step S1 comprises in this case with the suffix a (reference sign S1a) those raw data which are considered in the context of a predefined light production. The raw data considered with the suffix b (reference sign S1b) represent the runtime-variable input data, which cause the dynamic motor vehicle interior light effects or are used to generate dynamic motor vehicle interior light effects.

In each of FIGS. 2 to 5, step S2 comprises the processing of the raw data to determine the above-mentioned assignment rule therefrom. In step S2, the suffix a (reference sign S2a) identifies the processing of those raw data which are provided by the sensor 41 of the motor vehicle. The suffix b (reference sign S2b) identifies those raw data which are provided by the sensor 42 as ambient data UMD and the audio source 32 as the items of audio information AI. In substep S2c, the assignment rule is generated, which enables a runtime-calculated production LZI.

In each of FIGS. 2 to 5, step S3 comprises the coordination of an optionally provided predefined light production VLI (substep S3a) and the runtime-calculated light production LZI previously ascertained in step S2 (substep S3b). In substep S3c, predefined and runtime-calculated light productions VLI, LZI are overlaid to form an overlaid production OLI. In substep S3c, respective control commands, which comprise the control information for the interior light modules 20-24, are therefore provided and transmitted to the interior light modules 20-24 and/or the peripheral light control units 10-14.

Figure 2:
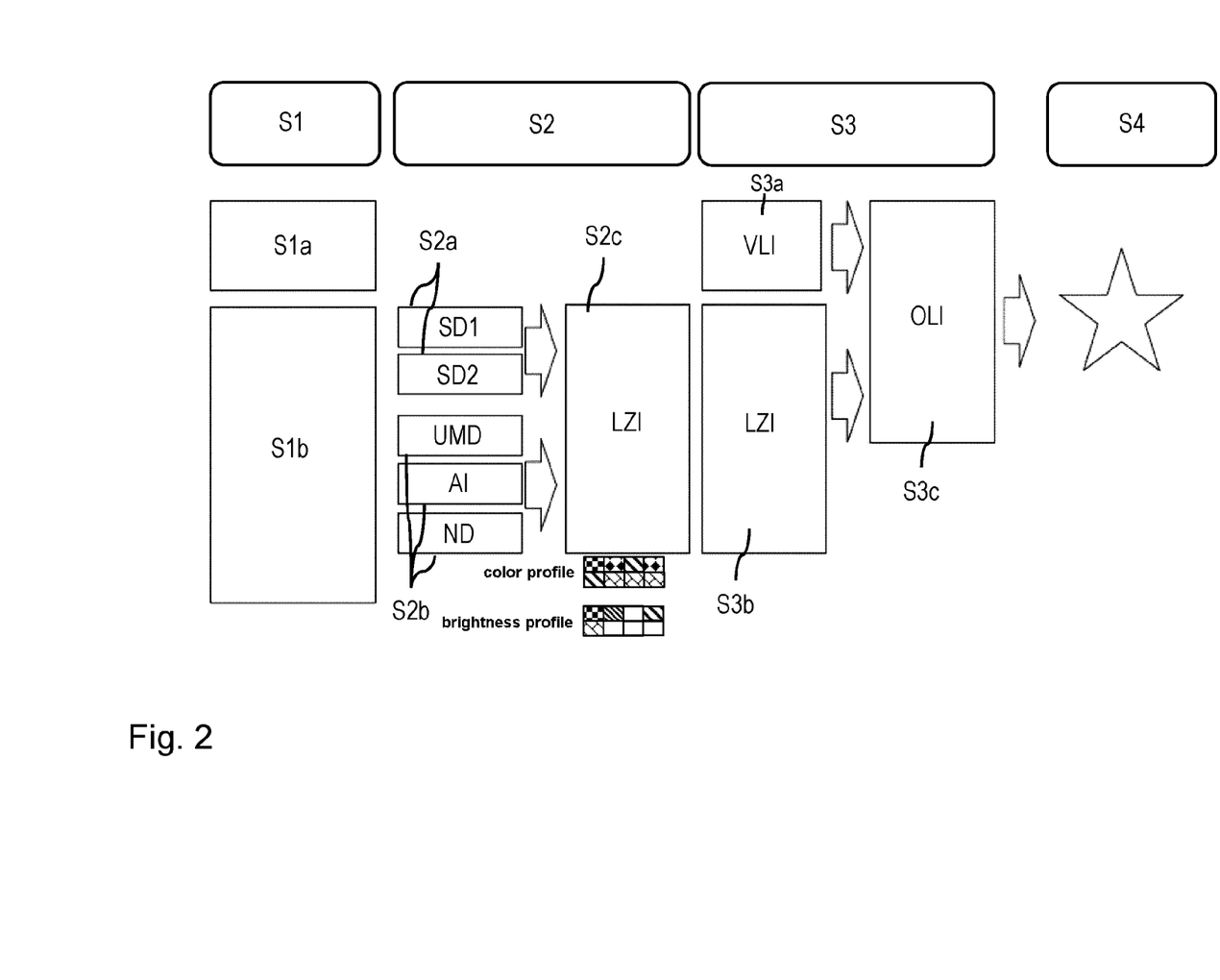
FIG. 2 shows a simplified schematic outline of the processing of current ambient conditions and/or variable data sources of the motor vehicle to ascertain a runtime-based motor vehicle interior light effect according to a first embodiment variant.

The exemplary embodiments shown in FIGS. 2 to 5 consider in detail the following raw data and process them as follows:

In the exemplary embodiment according to FIG. 2, in substep S1a, static vehicle and user configurations are considered to generate the predefined light production VLI. These can be mode, brightness, and color settings. These settings are typically selected by a user of the motor vehicle, so that the interior light modules 20-24 light up statically in a desired brightness and a desired color.

In substep S1b for generating the runtime-calculated production LZI, which is later overlaid on the predefined light production VLI, noteworthy color values of the surroundings, noteworthy brightness values of the surroundings, the rough position of color/brightness hotspots of the surroundings, the current velocity of the vehicle, and ambient conditions such as day/night, sunshine/moonlight, rain or snow, clouds/clear sky, and the like are considered. Optionally, geodata, such as the current position, the travel direction, local time zone, items of weather information, items of map information available online can additionally be considered.

In particular the surroundings of the motor vehicle 1 can be calculated in a model-based manner from the geodata. Different categories can be defined in this way, for example, such as travel through a "city at night with display windows", if colorfully lit surroundings were ascertained from the input data, "forest in the daytime" in the case of variable green tones in the surroundings, "country road at twilight" depending on the direction of the sunset light, etc. Optionally, items of audio information from a vehicle source internal or external to the vehicle can also be taken into consideration. In particular, frequency and/or volume and/or rhythm of the audio information can be evaluated for this purpose.

In substep S2a, sensor data SD1, SD2 of the motor vehicle, which are provided by the sensor 41 of the motor vehicle at the runtime, are processed. The sensor data SD1 can be, for example, images captured using a camera provided in the motor vehicle. The sensor data SD2 are, for example, items of velocity information, items of information of a brightness sensor, etc.

In substep S2b, ambient data UMD, for example from a navigation map of the motor vehicle, items of audio information AI, and user data ND are processed. These input data of substeps S2a, S2b, viewed as a whole, are processed in substep S2c to form the runtime-calculated production LZI. For this purpose, an assignment rule is determined from the runtime-variable input data, from which the assigned control information originates for a respective interior light module 20-24.

For this purpose, the input data can be assigned to an information matrix having a predefined number of pixels, which corresponds to the plurality of interior light modules 20-24 (here: five). The individual pixels are analyzed with respect to their color and brightness. The color can be described via RGB, HSV, or other color models. Colors can be considered to be the same, for example, if their parameters deviate from one another by less than a specified limit, for example+/−10%. A main color is then assigned to each of the pixels. This can be the color having the highest weighting within the pixel. The colors are weighted according to saturation, brightness, and frequency. High saturation, brightness, and frequency are, for example, weighted higher than a lower saturation, brightness, and lower frequency. As a result, an item of information on the color and brightness can thus be determined for each pixel of the information matrix. A color profile and a brightness profile of the information matrix result therefrom. These are shown visually in grayscales by way of example for a 2×4 matrix below substep S2c. The color profile and the brightness profile can be transmitted, as control information in a respective control command for the interior light modules 20-24, thereto or to their peripheral light control units 10-14.

The control commands having the control information contained therein are the result of the runtime-calculated light production LZI. As described above, in the exemplary embodiments described here, a solely optional overlay takes place with the predefined light productions VLI to form an overlaid light production OLI, which then comprises the correspondingly adapted control commands and items of control information.

Alternatively, it could be made possible for the user of the motor vehicle to select, for example, via a user menu, whether he prefers the use of the predefined light productions VLI or the runtime-calculated light production LZI.

Figure 3:
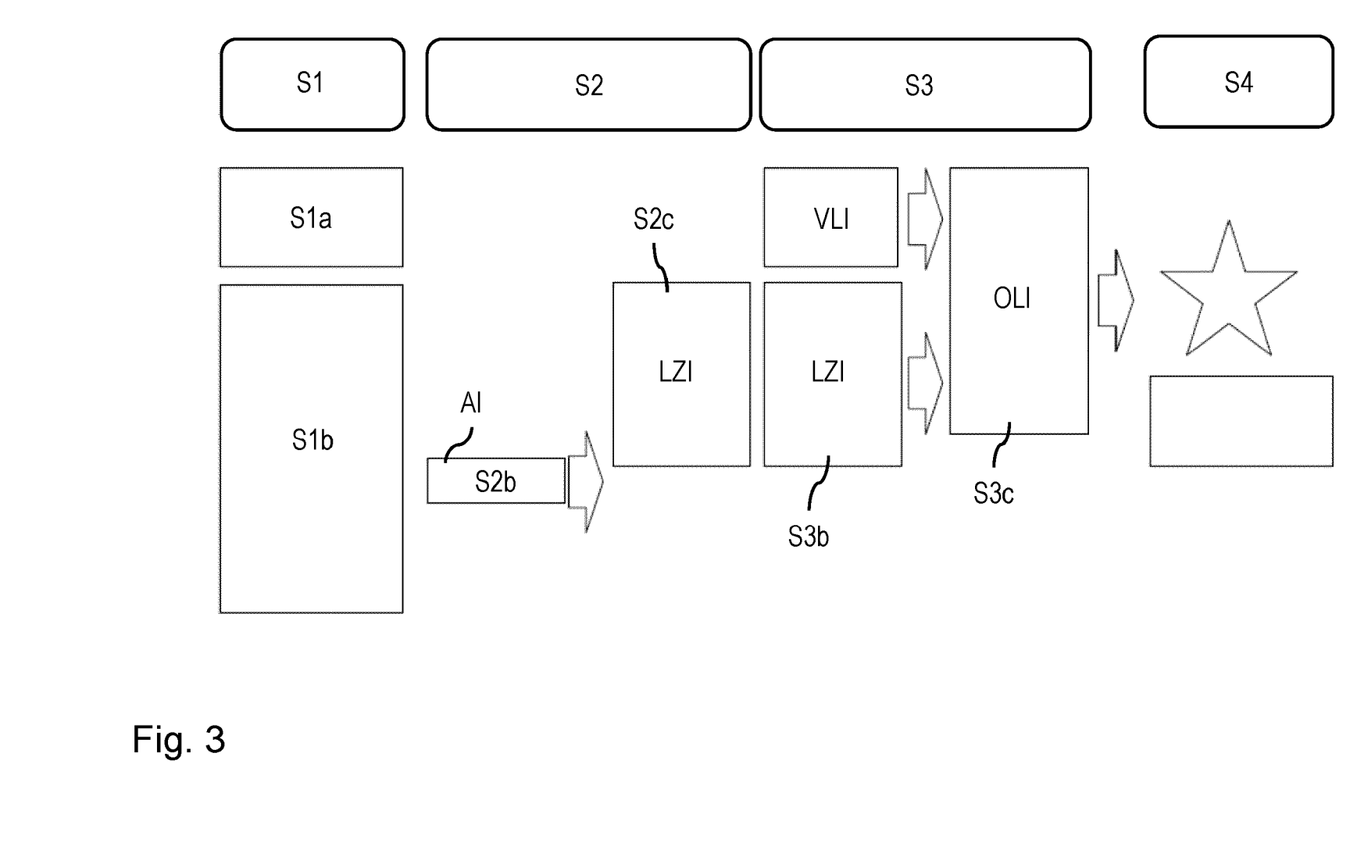
FIG. 3 shows a simplified schematic outline of the processing of current ambient conditions and/or variable data sources of the motor vehicle to ascertain a runtime-based motor vehicle interior light effect according to a second embodiment variant.

FIG. 3 shows an exemplary embodiment in which items of audio information AI, for example music, are processed as input data in substep S1b. The audio information AI can be evaluated in the processing in step S2, in which only the items of audio information AI are processed in substep S2b, with regard to frequency and/or volume and/or rhythm. Items of audio information AI are to be understood not only as sound sources of the motor vehicle or a user terminal. Sound signals captured by a microphone of the motor vehicle can also represent items of audio information in the meaning of embodiments of the invention. To generate the information matrix, frequencies are assigned to color values and volume levels are assigned to brightness values. For example, an analysis of the items of audio information according to rough frequency ranges and associated amplitude can take place via a frequency analysis. For example, a Fourier transform can be used for this purpose.

In particular, the spectrum can be divided into frequency ranges, wherein the amplitude is averaged in respective frequency ranges. The amplitudes of the frequency ranges are then expediently normed to a highest value. Frequency ranges, the amplitude of which does not exceed a threshold value, are assigned the amplitude value "0". A number of highlighted frequency ranges can then be filtered out from these frequency ranges and further processed in an amplitude frequency profile. Frequency ranges from the same frequency profile can be mapped onto the same number of colors of a color design. Amplitudes can be mapped onto the brightness, wherein, for example, "1" corresponds to the current brightness and "0" corresponds to "interior light module turned off". A brightness profile then results therefrom. Lower frequency ranges can be output, for example, on those interior light modules which are located in the vehicle at a lower height level (for example footwell). Moderate frequency ranges can be output, for example, on interior light modules which are at a moderate height level (for example instrument panel, inside of the doors, etc.). High frequency ranges can then be output on interior light modules located in the vehicle at an upper height level (for example in the roof or on the roof pillar).

Figure 4:
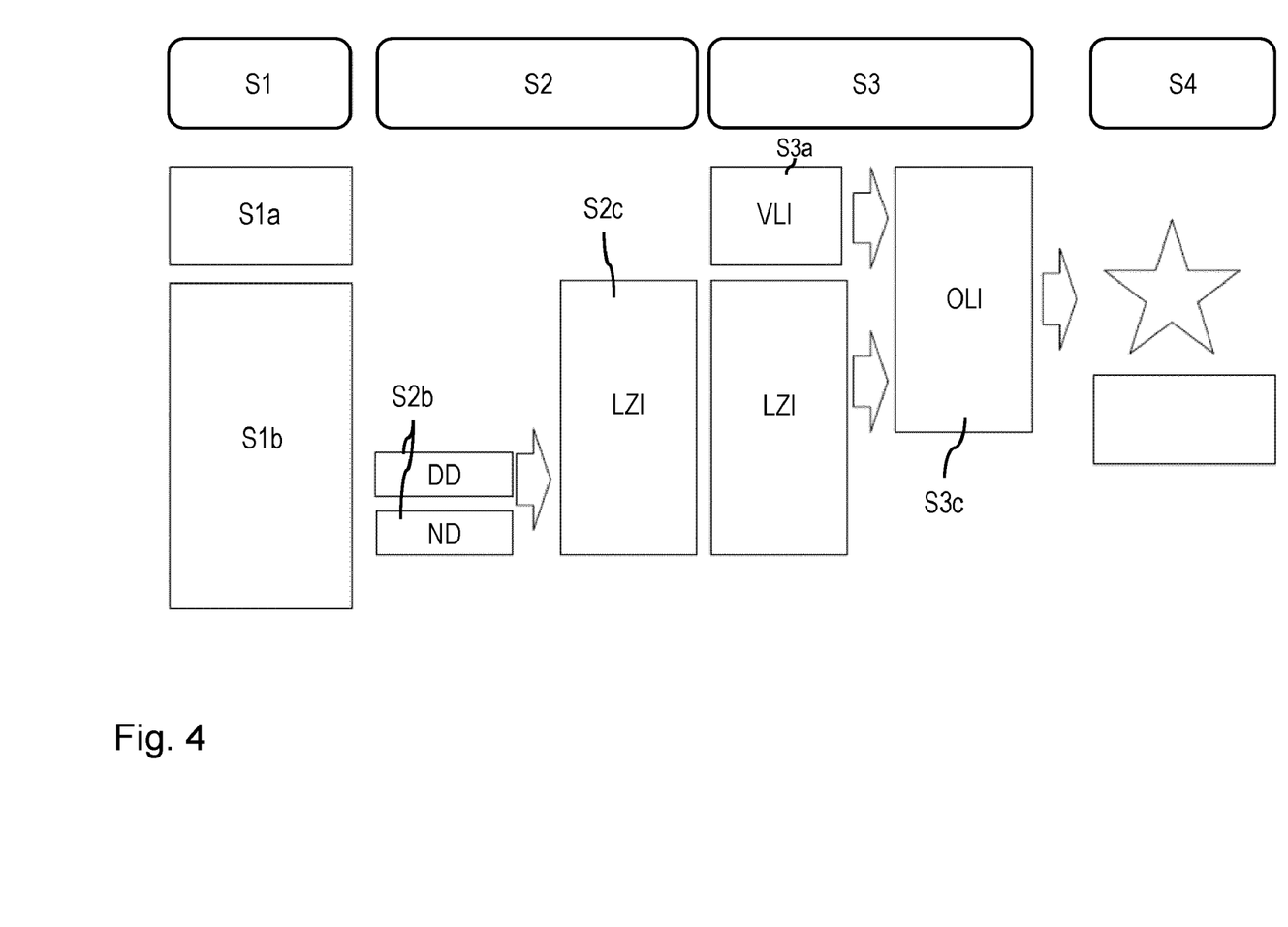
FIG. 4 shows a simplified schematic outline of the processing of current ambient conditions and/or variable data sources of the motor vehicle to ascertain a runtime-based motor vehicle interior light effect according to a third embodiment variant.

FIG. 4 shows a variant in which the display data DD and user data ND from the available runtime-variable input data are processed in step S2b to form the runtime-calculated production LZI in substep S2c. In this way, for example, the interior light modules can be activated in dependence on the display screen backgrounds selected by the user or cover art of a song title, which is displayed on a display screen of the motor vehicle.

Figure 5:
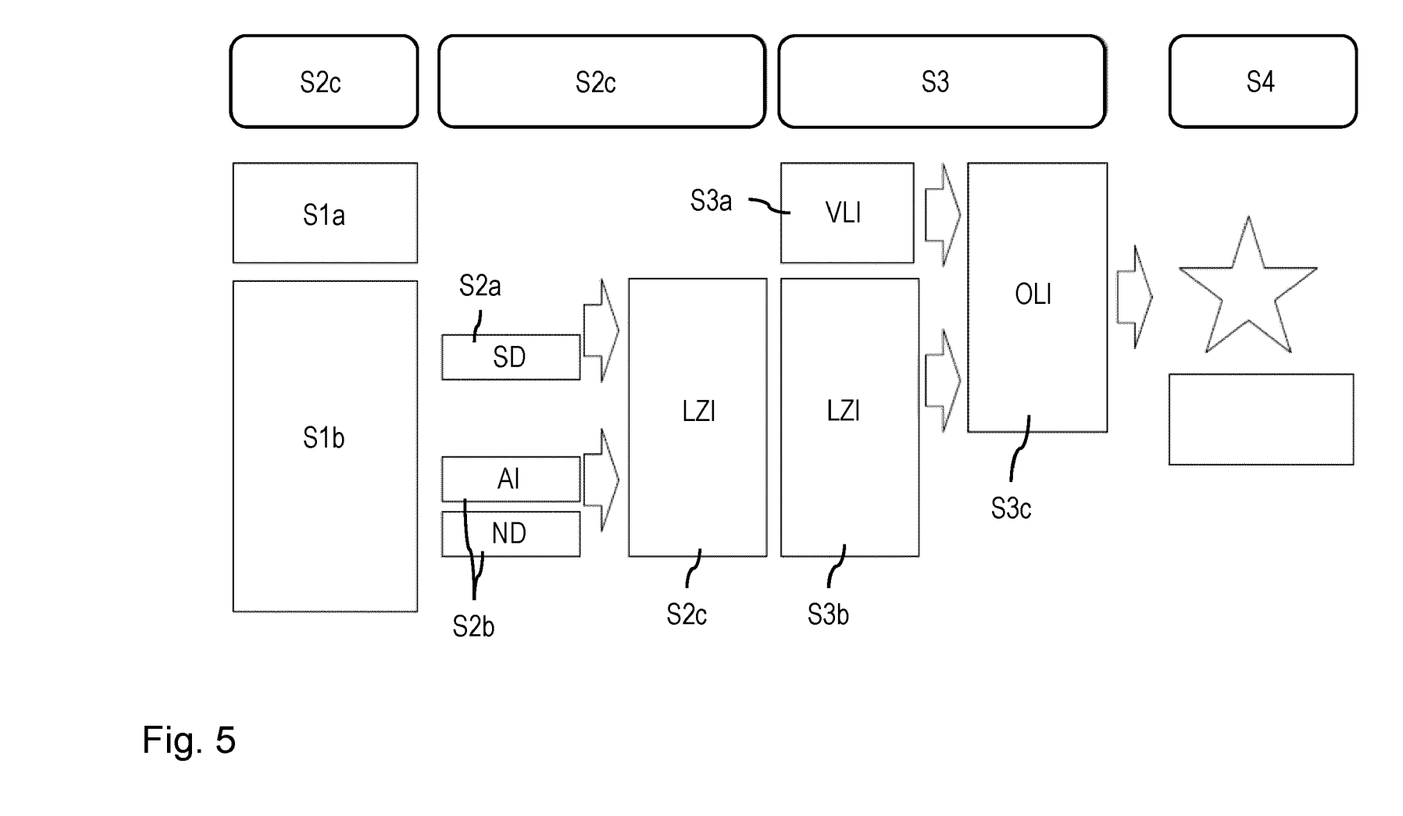
FIG. 5 shows a simplified schematic outline of the processing of current ambient conditions and/or variable data sources of the motor vehicle to ascertain a runtime-based motor vehicle interior light effect according to a fourth embodiment variant.

FIG. 5 shows a variant in which sensor data SD in substep S2a and audio information AI and user data SD in substep S2d are processed as the runtime-variable input data. A "karaoke mode" can be provided in this way, which offers a customer the possibility of reflecting their own singing visually via ambient light functions of the interior light modules 20-24. Music data from a sound source of the motor vehicle or a separate sound source of the user and items of audio information recorded by interior microphones of the motor vehicle are processed as input data.

The runtime-calculated production LZI can be, for example, in such a way that items of audio information AI of the music and items of audio information AI of the microphone recording are reflected via different interior light modules or different levels. An exemplary display can be generated by items of level, frequency, and rhythm information of the items of audio information (which represent sensor data SD here) recorded by the audio source 43 and the interior microphones (which represent a sensor 41).

Items of information about the actuation of operating elements (gestures, touch controls, speech commands), function types (audio, climate control, light, seat), and the like can also be processed as runtime-variable input data. During the operation of a climate control function, for example, visual feedback can be given with respect to the desired operation (for example blue light production for colder specified temperature and red light production for selected higher specified temperature) or the desired command.

LIST OF REFERENCE SIGNS 1 motor vehicle
5 central light control unit
10 peripheral light control unit
11 peripheral light control unit
12 peripheral light control unit
13 peripheral light control unit
14 peripheral light control unit
20 interior light module
21 interior light module
22 interior light module
23 interior light module
24 interior light module
30 data bus
41 sensor (for providing sensor data of the motor vehicle as input data)
42 sensor (for providing ambient data as input data)

43 audio source (for providing audio information as input data)
SD sensor data
UMD ambient data
AI audio information

The invention claimed is:

1. A motor vehicle, comprising:
a central light control unit,
a plurality of interior light modules, wherein each of the interior light modules comprises a single light source or a plurality of light sources,
a data bus, via which the central light control unit and the interior light modules are coupled to one another, wherein:
the central light control unit is configured to transmit respective control commands to the interior light modules to trigger motor vehicle interior light effects,
an item of control information contained in the control commands, which item of control information comprises at least one color value and one brightness value for the interior light modules, is generated from runtime-variable input data,
the runtime-variable input data are based on at least one of current ambient conditions of the motor vehicle or variable data sources of the motor vehicle,
the central light control unit is further configured to determine an assignment rule from the runtime-variable input data, from which assignment rule the item of control information originates for a respective interior light module,
the assignment rule includes an information matrix having a number of pixels,
the number of pixels corresponds to the interior light modules or groups of the interior light modules, and
each of the pixels comprises at least the color value and the brightness value for an assigned interior light module or an assigned group of interior light modules.

2. The motor vehicle according to claim 1, wherein the assignment rule is generated from an image.

3. The motor vehicle according to claim 2, wherein the image is a light scene outside the motor vehicle recorded by a camera of the motor vehicle at runtime.

4. The motor vehicle according to claim 2, wherein the image is an image of a display screen of the vehicle captured at runtime.

5. The motor vehicle according to claim 1, wherein the assignment rule is generated from sensor data of the motor vehicle.

6. The motor vehicle according to claim 5, wherein at least one of a brightness value or a color value is ascertained from the sensor data.

7. The motor vehicle according to claim 5, wherein at least one of a brightness value or a color value is ascertained from the ambient data.

8. The motor vehicle according to claim 5, wherein a movement effect for light sources of a respective group of the interior light modules is ascertained from the sensor data.

9. The motor vehicle according to claim 8, wherein:
the sensor data comprise items of geoinformation of the motor vehicle,
at least one of a brightness value, a color value, or the movement effect is determined or corrected as a function of a value of the items of geoinformation, and
one or more of the following parameters is processed as geoinformation: motor vehicle position, travel direction, local time zone, weather information, map information, or time of day.

10. The motor vehicle according to claim 5, wherein a movement effect for light sources of a respective group of the interior light modules is ascertained from a current vehicle velocity.

11. The motor vehicle according to claim 5, wherein a movement effect for light sources of a respective group of the interior light modules is ascertained from the ambient data.

12. The motor vehicle according to claim 1, wherein:
the assignment rule is generated from ambient data, and
at least one of a traffic situation or an ambient brightness is processed as the ambient data.

13. The motor vehicle according to claim 1, wherein the assignment rule is generated from at least one of an item of audio information of the motor vehicle, a user terminal, or a voice of a user of the motor vehicle.

14. The motor vehicle according to claim 13, wherein:
the audio information comprises at least one of a frequency, a volume, or a rhythm of an audio signal, and
the audio signal is at least one of output by the motor vehicle or captured by a microphone of the motor vehicle.

15. The motor vehicle according to claim 1, wherein the control information from the runtime-variable input data, which is contained in the control commands, is overlaid with further items of control information, which cause predefined light effects.

16. The motor vehicle according to claim 1, wherein the control information from the runtime-variable input data, which is contained in the control commands, is overlaid with further items of control information, which cause static light effects.

17. The motor vehicle according to claim 1, further comprising:
a plurality of peripheral light control units distributed in the motor vehicle, wherein:
the plurality of interior light modules are each assigned a peripheral light control unit, and
the central light control unit and the peripheral light control units are coupled to one another via the data bus.

* * * * *